Figure 3:
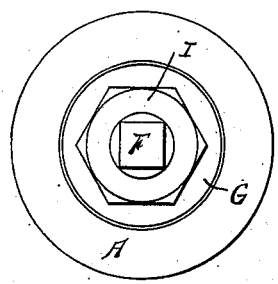

No. 700,351. Patented May 20, 1902.
H. T. MASON.
STOPPER FOR BOILER TUBES OR HOLLOW SHAFTING.
(Application filed Aug. 14, 1901.)
(No Model.)

WITNESSES
INVENTOR
Henry T. Mason
By
Attorneys.

UNITED STATES PATENT OFFICE.

HENRY T. MASON, OF CHICAGO, ILLINOIS.

STOPPER FOR BOILER-TUBES OR HOLLOW SHAFTING.

SPECIFICATION forming part of Letters Patent No. 700,351, dated May 20, 1902.

Application filed August 14, 1901. Serial No. 72,015. (No model.)

*To all whom it may concern:*

Be it known that I, HENRY T. MASON, a citizen of the United States, residing at Chicago, in the county of Cook and State of Illinois, have invented certain new and useful Improvements in Stoppers for Boiler-Tubes or Hollow Shafting, of which the following is a specification, reference being had therein to the accompanying drawings.

The invention has reference to a stopper adapted for use in connection with hollow shafting for the purpose of bracing the latter or of forming oil-reservoirs within the bore of the shafting, and is also adapted to be used in connection with boiler-tubes to prevent leakage in the latter.

The invention consists in the novel construction of the stopper and in the peculiar arrangement and combination of its various parts, as will be fully hereinafter described, and shown in the drawings, in which—

Figure 1:
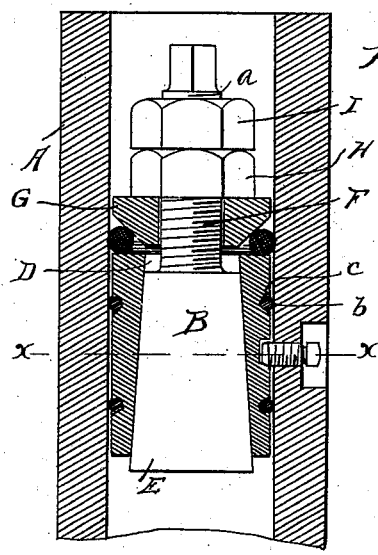
Figure 2:
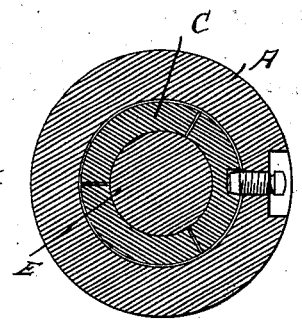
Figure 4:
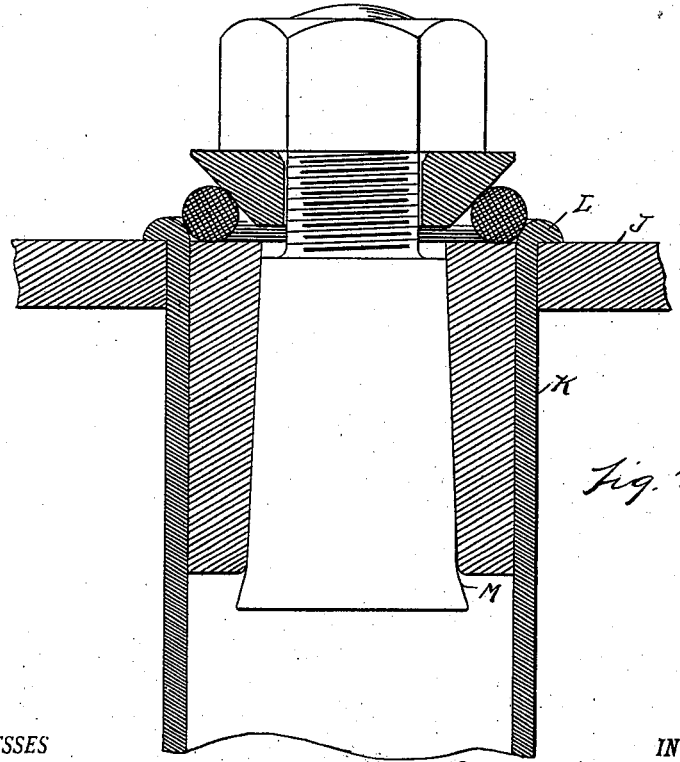

Figure 1 is a vertical central section through a section of hollow shafting and through my improved stopper applied thereto. Fig. 2 is a cross-section on line $x\,x$ of Fig. 1. Fig. 3 is a plan view, and Fig. 4 is a central sectional view through a modified form of stopper and a portion of the boiler-tube to which it is applied.

In the drawings thus briefly described the reference-letter A designates a hollow shaft in which a stopper B may be located at different points in the interior thereof for the purposes above set forth.

In construction the stopper comprises a head formed in sections, such as C, preferably three in number, as shown in Fig. 2. The head has also a tapering opening D extending centrally and longitudinally therethrough in which is fitted a conical wedge E. The wedge is preferably solid and is provided with a shank or stem F, which projects beyond the head and is threaded at its free end, as at $a$. Loosely sleeved upon the shank is a clamping member or plate G, preferably formed of steel and conical in configuration. Intermediate the clamp and the head end adjacent to the clamp is arranged a ring of compressible material, preferably lead. The packing-ring is of a size to cover, when compressed and expanded by the clamping member, the joints between adjoining sections of the head, and thus prevent leakage through the head. Threaded upon the shank described, adjacent to the clamping-plate, is a nut H, which upon being turned by a suitable socket-wrench inserted within the shaft-bore draws the wedge and clamp together. The head is thus expanded within the shaft and the packing compressed to cover the section-joints for the purpose set forth.

I preferably use in connection with the head fuse-rings, such as $b$, arranged in suitable grooves $c$ in the sections. Also to prevent the stopper from working loose within the shafting I employ a lock-nut I, as plainly shown in the drawings.

In Fig. 4 I have shown a modified type of stopper particularly adapted for use in boiler-tubes. In this figure J designates a boiler-head, K one of the boiler-tubes, the latter being provided with a bead L, which partially overlaps the head. The construction of the plug is similar to that described, with the exception that at its lower end the wedge flares, as at M. In expanding the head to fix the stopper within the tube the flaring portion M is drawn tightly against the lower edge of the head-sections, forming a tight joint, so as to effectively prevent leakage between the head and wedge. Also, by locating the packing-ring so as to bear against the bead L of the tube, as indicated in Fig. 4, in addition to serving as a packing for the section-joints the ring when compressed forces the tube end tightly against the walls of the aperture in the boiler-head, thereby forming a tight connection between the parts.

What I claim as my invention is—

1. The combination with a hollow metallic member, of a stopper therein comprising an expansible head formed in sections, compressible material covering the joints between adjoining sections of the head, and means for expanding the head and the compressible material.

2. A stopper for boiler-tubes or hollow shafting, comprising an expansible head formed in sections and having an opening extending longitudinally therethrough, a wedge member within the opening, a shank or stem carried by the wedge projecting beyond the head, a clamping member upon the shank, compressible material intermediate said clamping member and the head, and means upon the shank for drawing the wedge and clamp together to expand the head and the compressible material.

3. A stopper for metallic tubing comprising an expansible head formed in sections and having a tapering opening extending longitudinally therethrough, a wedge within the opening carrying a shank or stem threaded at its free end, a clamping-plate loosely sleeved upon the shank, a ring of compressible material intermediate the plate and the head, and a nut engaging the shank and bearing against the plate.

4. A stopper for boiler-tubing or hollow shafting, comprising an expansible head formed in sections and having a tapering conical opening extending centrally and longitudinally therethrough, a conical wedge fitting within the opening, said wedge contacting with the walls of the opening throughout the entire length of the latter and having a flaring section at its outer end abutting against the edges of the head-sections, a shank or stem integral with the wedge and projecting beyond the head, a conical clamping-plate loosely sleeved upon the shank, a ring of compressible material intermediate the head and the plate and a nut threaded upon the free end of the stem adapted to bear against the plate.

In testimony whereof I affix my signature in presence of two witnesses.

HENRY T. MASON.

Witnesses:
JOHN DUPUIS,
PATRICK CARLIN.